April 29, 1941.  L. C. PILCHER  2,239,827
HARVESTING AND STORAGE BIN
Filed Jan. 28, 1939  2 Sheets-Sheet 1
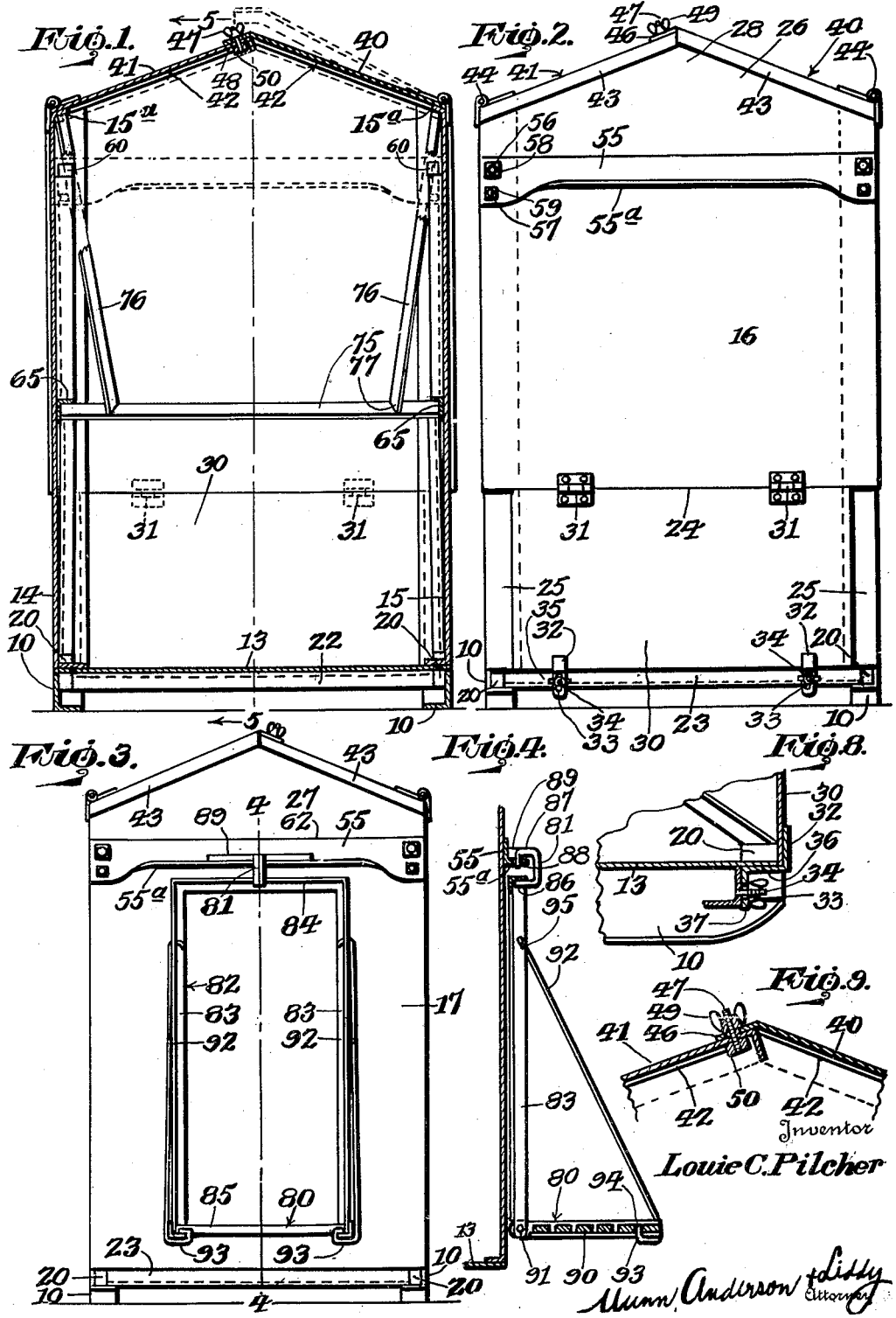

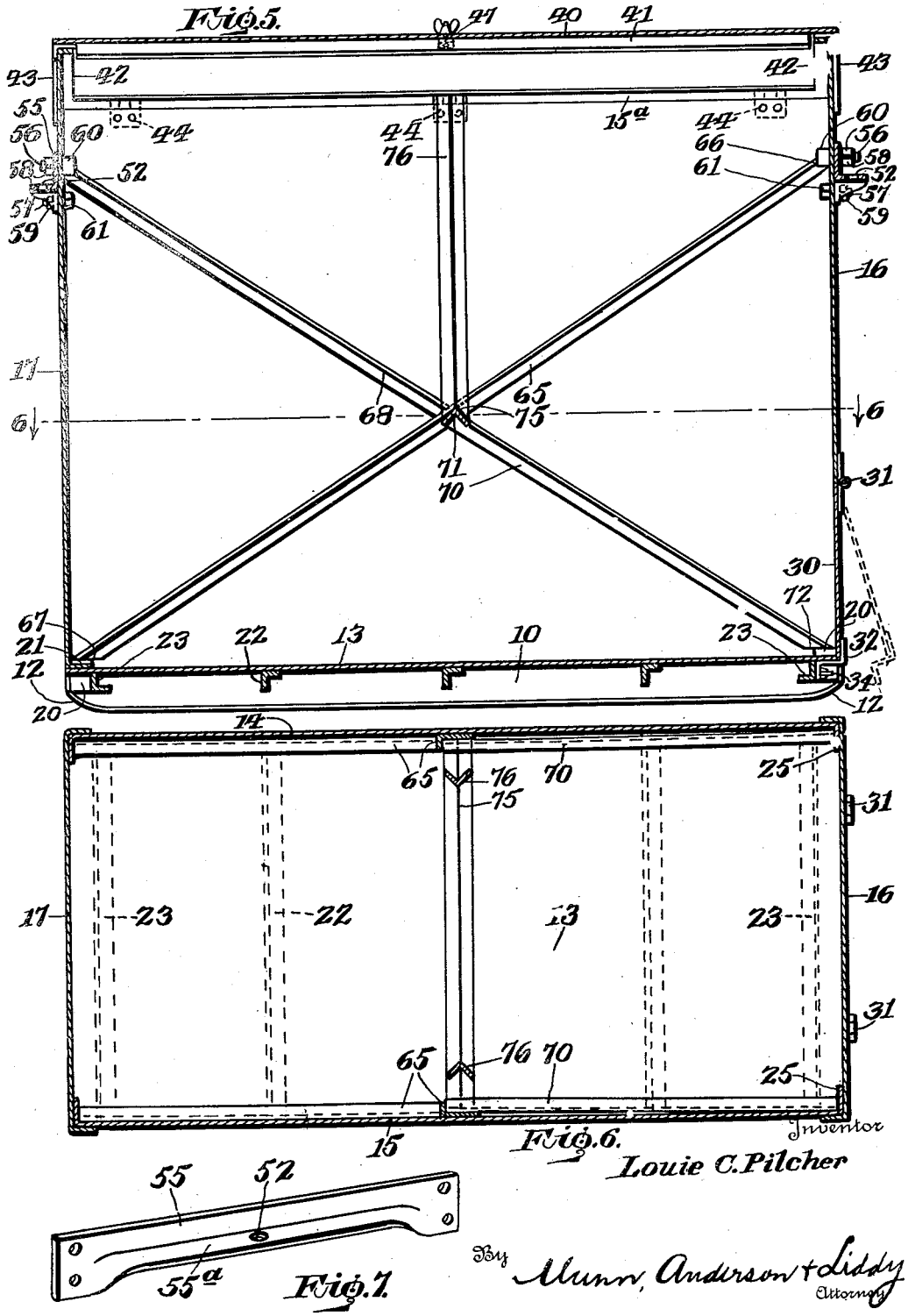

Patented Apr. 29, 1941

2,239,827

UNITED STATES PATENT OFFICE 2,239,827

HARVESTING AND STORAGE BIN

Louie Crayton Pilcher, Dothan, Ala.

Application January 28, 1939, Serial No. 253,460

7 Claims. (Cl. 220—1.5)

This invention relates to harvesting bins for seed cotton and is particularly adapted for use in storing the seed cotton.

When seed cotton is picked in the fields the laborer usually places it in bags and these bags after being filled may be tied and placed to one side until they are picked up by a wagon or truck for that purpose. These bags are then dumped into the truck and the wagon or truck then conveys the picked cotton to the cotton gin. Various means have been employed to facilitate the handling of the cotton after it is picked from the plants and trailers or supporting frames have been employed in the fields and these are filled with cotton from the bags or sacks after which they are drawn to the cotton gin.

The operator of the truck when he reaches the cotton gin, with the cotton loaded on his vehicle, must get in line and wait his turn until the laborers at the mill will have an opportunity to gin the cotton as it is removed. It is not an infrequent occurrence that a driver may have to wait as much as twenty-four hours or more before he is able to have his cotton ginned whereby considerable time is lost unless he is fortunate enough to arrive at a time when very little work is being done at the cotton gin.

It is an object of the present invention to provide a harvesting bin for seed cotton of a suitable size which may be readily placed upon trucks after they have been filled with cotton in the field and hauled to the cotton gin or the bins may be filled while they are in the trucks, these bins being sealed against moisture they may be stored in the open at the cotton gin until the operators of the cotton gin are ready to gin the cotton from the bins.

Another object of the invention is the provision of a harvesting bin which may be neatly closed to exclude moisture either adjacent the cotton fields or at the cotton gins, the bins being so constructed and reinforced that they may be lifted by cranes or other suitable instrumentalities for placing them on trucks or removing them from the trucks without the bins being distorted or injured.

A further object of the invention is the provision of a neat and compact bin which may be completely opened at the top for packing cotton therein and which may then be closed and sealed against moisture, the bins being so shaped that a great number of them may be placed upon a truck so that the operator of the truck may carry the loaded bins to the cotton gin and deposit them and then return the empty bins for further filling, a support or scaffolding being provided for ready connection with a draw bar secured to the bin so that a workman may stand upon the support and conveniently dump the cotton into the upper open end of the bin.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a transverse vertical section of a cotton harvester bin constructed in accordance with the principles of my invention, Figure 2 is a view in elevation of one end of the bin, Figure 3 is a view in elevation of the opposite end of the bin showing a scaffolding applied thereto, Figure 4 is a vertical section taken along the line 4—4 of Fig. 3, Figure 5 is a vertical longitudinal section taken along the line 5—5 of Fig. 1, Figure 6 is a horizontal section taken along the line 6—6 of Fig. 5, Figure 7 is a view in perspective of a draw bar, in detached relation, of the bin, Figure 8 is an enlarged fragmentary vertical section of one of the lower corners of the bin, Figure 9 is an enlarged fragmentary vertical section of the top of the bin.

Referring more particularly to the drawings it will be seen that a pair of skids 10 support the bin upon the ground and these skids are formed of angle irons running the length of the bin and located at the lower end of each side wall of said bin. These skids at their opposite ends, as shown in Fig. 5, are curved upwardly, as at 12, so that they may be readily drawn along the ground or upon a foundation or platform as will be presently explained.

The bin includes a bottom 13, side walls 14 and 15 and end walls 16 and 17.

Relatively heavy metal bars 20 are welded to the vertically disposed flanges of the skids 10 and also to the inner face of the lower ends of the side walls 14 and 15. The end wall 17 is provided with an inturned flange 21 at its lower edge and this is welded to the base member 13. Angle irons 22 and 23 space the skids 10 from the base 13 and these angle irons run transversely of the bin and are welded not only to the underface of the base 13 but are also welded to the skids 10. The longitudinal side edges of the base member 13 are also welded to the inner faces of the bars 20. The lower edges of the end walls 16 of the bin are welded to the adjacent ends of the base member 13.

The end wall 16 terminates at 24, as shown in Fig. 2, to provide an opening through which the cotton seed may be withdrawn when desired after they have been stored in the bin. It will be noted from this figure that the side walls 14 and 15 have extensions at their lower ends, as shown at 25, and these extensions are bent at a right angle to complete the end wall 16 below the door section.

It will be noted that the end walls 16 and 17, as shown at 26 and 27, respectively, are elevated above the horizontal plane passing through the upper edges of the side walls 14 and 15. This extension is sheared off at an angle to form a triangular upper section having its apex at 28.

A door 30 closes the opening at the lower end of the end wall 16 and is hinged, at 31, to the lower end of said wall. Tongues 32 are secured to the lower end of the door 30 and these tongues are provided with slots 33 to receive a threaded bolt 34 upon which a wing nut 35 is screwed. The bolts 34, as shown in Fig. 8, are welded to or threaded into openings in the transverse angle iron 23 below the end wall 16 and project outwardly beneath the bottom or floor 13 of the bin but are located inwardly of a plane passing through this wall 16. As shown more particularly in Figs. 5 and 8 it will be seen that each tongue 32 has an inbent right angular portion 36 located in a horizontal plane and adapted to normally contact the bottom of the floor 13 and another angular portion 37 extends downwardly at a right angle from the portion 36 and this portion is provided with a slot 33, as shown in Figs. 4 and 8, through which the threaded bolt 34 is passed when the door 30 is in closed position.

The upper open end of the bin through which the cotton is passed when the cotton is loaded into the bin is closed by a pair of hinged lids 40 and 41. As seen in Figs. 1 to 3, inclusive, and Fig. 9, these lids are located at an angle to the horizontal and rest upon the inclined edges 42, respectively, of the upper end of the end walls 16 and 17. The opposite ends of the lids are provided with flanges 43 which engage the outer surfaces of the end walls for aiding in sealing the bins for preventing moisture from getting into the bins during the rainy season. Each of the lids are provided with a plurality of hinges 44 which are secured to the side walls and also to the outer surface of the lids 40 and 41 so that the lids may be swung outwardly and away from the top of the bin for exposing the entire open end whereby the bins may be readily filled with cotton.

It will be noted that the free edge of the lid 40 is provided with an overhanging flange 46 which is adapted to lie in flat contact with the outer surface of the other lid 41 so that when the lids are in position the upper end of the container will be sealed against moisture.

The lid 41 is provided with a threaded bolt 47 which passes through a slot 48 formed in the flange 46 and a nut 49 is screwed onto the projecting end of the threaded bolt for securing the lid 40 in fixed relation on the lid 41. The nut 49 draws the flange 46 up tight upon the outer surface of the lid 41. While I have shown a single threaded bolt it will be appreciated that a number of bolts may be employed for the purpose. The inner end of the bolt is provided with a head, as shown at 50, and this head is welded to the inner face of the lid 41.

A draw bar 55 is secured to each of the end walls 16 and 17 adjacent the upper end by means of bolts 56 and 57 and nuts 58 and 59, respectively, threaded onto the bolts 56 and 57. The bolt 57 is slightly smaller than the bolt 56 and the heads of these bolts, as shown at 60 and 61, are located on the inside of the bin. The longitudinal upper edge 62 of each draw bar is either riveted or welded to its respective side wall.

On each inner face of the side walls 14 and 15 is welded or riveted an angle reinforcing bar 65, as shown in Figs. 5 and 6. The upper end of this angle iron is connected at 66 to the head 60 on the threaded bolt 56. The lower end of the reinforcing angle iron bar 65, as shown at 67, is sheared off and is connected to the bar 20 adjacent the end wall 17.

A diagonally disposed iron bar 68 has its upper end welded to the head 60 of the bolt 56 which projects through the end wall 17 and this angle iron extends downwardly to the central portion of the angle iron 65 and is not only welded to the side wall 14 but has its ends welded to the intermediate portion of the angle iron 65 where the lower end of the bar 68 abuts the bar 65. A second angle iron 70 has its upper end, as shown at 71, welded to the intermediate portion of the angle iron 65 and has its lower end sheared off, as shown at 72, and welded to the bar 20 adjacent the wall 16. The angle iron 70 is also welded or riveted to the side wall 14.

It will be noted from Fig. 6 that a similar construction is applied to the side wall 15.

A transverse bar 75 extends across the center of the bin and has its ends welded to the angle irons 65. It will be noted that this bar is of an angle iron construction and is so disposed that a cross section resembles an inverted V. A brace bar 76 extends from the transverse bar 75 inwardly of its end, as shown in Fig. 1, and not only has its lower end, as shown at 77, welded to the transverse bar 75, but has its upper end welded to the inner face of the side wall 14 opposite the lower leaf of the hinge 45. A reinforcing bar 76 is located at each side wall.

It will be seen by this construction that the side walls are not only reinforced to prevent bulging and sagging of the walls, but the angle iron braces 65 and 68 are connected with the heads 60 of the threaded bolts 56 so that when the hooks of the hoist are engaged beneath the projecting portion 55a of the draw bars 55 that this pull will not be directly on the side wall but this pull will be transmitted through the reinforcing bars 65 and 68 along the side walls and downwardly through the angle irons 70 to the bottom or base of the bin.

A removable swing or scaffolding, generally designated by the numeral 80, in Figs. 3 and 4, is removably supported from the bar 55 by means of a pin 81. This swing or scaffolding consists of a rectangular frame generally designated by the numeral 82 and is composed of side bars 83, a top bar 84 and a bottom bar 85. These bars are of angle iron construction, as shown in Fig. 4. The hook 81 has its lower end 86 secured to the underface of the flange of the angle iron bar 84 and this hook extends upwardly and inwardly, as shown at 87, and downwardly, as at 88, to be received within an opening 52 formed in the projecting portion 55a of the draw bar 55. A bar 89 is secured to the pin 81 at the depending portion 88 and this bar engages the draw bar 55 at opposite sides of the pin and prevents swinging of the support.

A platform 90 is hingedly connected at 91 to the side bars 83 and rods 92 are provided with hooks 93 at the lower end which engage with openings 94 in the platform 90. The upper ends of these rods are provided with hooks 95 which are received by openings in the bars 83.

By raising the platform 90 the hooks 93 may be released from the openings 94 so that the platform may be swung inwardly and folded in a neat compact manner when not in use. The entire support may be removed from the bin when the pin 88 is released from the opening 89 in the draw bar 55.

A plurality of the bins are adapted to be placed on a truck side by side and it will be noted that there are no projections whatever on the side walls so that these bins may be fitted in close contact in order that the greatest number possible can be placed on a truck. These bins are then conveyed to the field where the cotton is to be picked and they are removed from the truck and placed at intervals in the field whereby the cotton may be dumped therein.

Each of the bins are provided with a pair of skids 10 so that the bins may be readily drawn along the ground and these skids also facilitate the loading or unloading of the bins on the trucks. The draw bars 55 are also provided for the purpose of raising or lowering the bins by means of cranes or other suitable mechanism and in this case hooks are engaged within the openings 52 in the draw bars 55 whereby when the usual chains or cables are drawn upwardly the bins will be raised from their support.

The walls of the bins are reinforced by means of the diagonally disposed bars 65, 68 and 70 and also by means of the vertically disposed bars 76 and the horizontally disposed bar 71. The last-mentioned bars prevent lateral bulging of the bin while the diagonally disposed bars and the vertically disposed bars prevent distortion of the bin when the bin is being loaded on the truck and when the weight is thrown upon the draw bars 55 since the diagonally disposed bars are connected with the bolts 56 and 57. Furthermore, the vertically disposed bars 76 are connected between the transverse bar 75 and the hinges 45. The lower ends of the diagonally disposed bars 70 and 65 are rigidly connected at their lower ends with the horizontally disposed reinforcing bars 20 which aid in connecting the skids with the side walls 14 and 15.

Provision has been made to exclude moisture from the bins and this is an important feature since the bins when loaded with cotton may be left in the fields or they may be placed in the opening adjacent the cotton gin and the cotton stored therein will not be affected by unfavorable weather conditions. The lids 40 and 41 are provided with flanges 43 which overlap the end walls of the bin while the lids themselves rest upon the flanges 15a projecting inwardly from the side walls 14 and 15. The flange 46 also overlaps the lid 41 so that the bins are thoroughly sealed.

When the driver of a truck conveys a number of loaded bins to the cotton gin it is only necessary for him to unload these bins at the mill and take on a second load of empty bins and these are then carried to the cotton field for filling. This eliminates the necessity of the operator of the truck waiting his turn to have his cotton ginned directing from the truck or other vehicle so that he may be able to make a number of trips instead of waiting many hours for his turn to dispose of the cotton.

When a sufficient quantity of cotton has been picked the bins may be retained directly on the truck and the cotton may be loaded into the bins in this position because the support or swing may be removably secured to one of the draw bars after the lids have been opened and the operator will then stand upon the support 90 and after the bags are handed to him he will dump them directly into the upper open ends of the bins. Since the bins are so constructed that they will substantially extend transversely of the flat bottom of a truck, a number of workmen may be supplied with the swings or supports for dumping the cotton into the bins.

The door 30 is only used when the workmen at the cotton gin, after having removed the lint from the seeds, will fill the bin with the seeds which have been removed so that the farmer can carry the seeds back to his farm. The cotton is removed from the upper open end of the bin after the lids 40 and 41 have been turned back by means of the usual suction pipe which is dropped into the bin for withdrawing the cotton.

I claim:

1. A harvesting and storage bin for cotton provided with a bottom, side walls and end walls, longitudinal bars supporting the bottom above the ground, vertical bars connecting the longitudinal bars to the side walls, transverse bars connecting the longitudinal bars together and supporting the bottom, diagonally disposed bars secured to the side walls and to the vertical bars, lids hingedly connected to the upper edges of the side walls for closing the top of the bin.

2. A harvesting and storage bin for cotton provided with a bottom, side walls and end walls, vertical bars secured to the lower edges of the side walls, diagonally disposed bars secured to the inner face of each side wall, the lower ends of the said bars being rigidly secured to the ends of the vertical bars, a transverse bar connected at its ends to the intermediate portions of the diagonally disposed bars and extending across the middle portion of the bin, and lids closing the upper open end of the bin.

3. A harvesting and storage bin for cotton provided with a bottom, side walls and end walls, vertical bars secured to the lower edges of the side walls, diagonally disposed bars secured to the inner face of each side wall, the lower ends of the said bars being rigidly secured to the ends of the vertical bars, a transverse bar connected at its ends to the intermediate portions of the diagonally disposed bars and extending across the middle portion of the bin, a pair of lids closing the upper end of the bin, a plurality of hinges swingably mounting the lids in the upper edges of the side walls, and brace bars having one end secured to the transverse bar adjacent each end of said bar and having the other end secured to a hinge.

4. A harvesting and storage bin for cotton provided with side and end walls and a bottom, the upper ends of the side walls being higher than the side walls and having inclined edges extending from a central point to the tops of the side walls, the upper ends of the side walls having inturned flanges inclined upwardly at the same angle as the inclined edges of the end walls, a lid hingedly connected to the upper edge of each side wall and resting on the inclined flanges and the inclined edges of the end walls, the free edges of one lid having an overlapping flange engaging the free edge of the other lid, and means on the free edge of the second-mentioned lid for securing the flange of the other lid rigidly to the second-mentioned lid.

5. A harvesting and storage bin for cotton provided with a bottom, side walls and end walls, vertical bars secured to the lower edges of the side walls, diagonally disposed bars secured to the inner face of each side wall, the lower ends of the said bars being rigidly secured to the ends of vertical bars, a transverse bar connected at its ends to the intermediate portions of the diagonally disposed bars and extending across the middle portion of the bin, draw bars disposed transversely on the end walls, bolts for securing the bars to said walls and provided with heads located within the bin, the upper ends of the diagonally disposed bars being welded to the heads, and lids closing the upper open end of the bin.

6. A harvesting and storage bin for seed cotton provided with a bottom, side walls and end walls, one end wall terminating short of the bottom to provide an opening, the side walls having projections which are turned inwardly towards each other at the opening in the end wall to form part of said end wall, a door hingedly connected to the lower end of said end wall for closing the opening, and a pair of hinged lids closing the top of the bin.

7. A harvesting and storage bin for cotton provided with a bottom, side walls and end walls, longitudinal bars supporting the bottom above the ground, vertical bars connecting the longitudinal bars to the side walls, transverse bars connecting the longitudinal bars together and supporting the bottom, diagonally disposed bars secured to the side walls and to the vertical bars, lids hingedly connected to the upper edges of the side walls for closing the top of the bin, the lids having depending flanges engaging the end walls, one lid having a flange at the free edge overlapping the free edge of the other lid, flanges bent inwardly from the free edges of the side walls and contacting the lids when closed.

LOUIE CRAYTON PILCHER.